United States Patent
Asokan et al.

(10) Patent No.: US 7,178,041 B2
(45) Date of Patent: Feb. 13, 2007

(54) METHOD, SYSTEM AND COMPUTER PROGRAM PRODUCT FOR A TRUSTED COUNTER IN AN EXTERNAL SECURITY ELEMENT FOR SECURING A PERSONAL COMMUNICATION DEVICE

(75) Inventors: Nadarajah Asokan, Espoo (FI); Jan-Erik Ekberg, Helsinki (FI); Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 864 days.

(21) Appl. No.: 10/046,274

(22) Filed: Jan. 16, 2002

(65) Prior Publication Data
US 2003/0079122 A1 Apr. 24, 2003

Related U.S. Application Data

(63) Continuation-in-part of application No. 09/978,701, filed on Oct. 18, 2001.

(51) Int. Cl.
*H04L 9/32* (2006.01)
*G06F 7/04* (2006.01)

(52) U.S. Cl. .............. 713/194; 713/189; 713/156; 726/2

(58) Field of Classification Search ............ 713/156, 713/184, 189, 194; 380/286; 726/20, 21, 726/2
See application file for complete search history.

(56) References Cited

U.S. PATENT DOCUMENTS

| 4,200,770 A | * | 4/1980 | Hellman et al. ............ 380/30 |
| 4,523,087 A | | 6/1985 | Benton |
| 5,544,246 A | * | 8/1996 | Mandelbaum et al. ........ 705/65 |
| 5,590,197 A | * | 12/1996 | Chen et al. ................. 705/65 |
| 5,604,787 A | | 2/1997 | Kotzin et al. |
| 5,621,797 A | | 4/1997 | Rosen |
| 5,623,637 A | * | 4/1997 | Jones et al. ................ 711/164 |
| 5,668,878 A | * | 9/1997 | Brands ...................... 380/30 |
| 5,724,417 A | * | 3/1998 | Bartholomew et al. 379/211.05 |
| 5,754,654 A | | 5/1998 | Hiroya et al. |
| 5,768,389 A | | 6/1998 | Ishii |
| 5,781,723 A | | 7/1998 | Yee et al. |

(Continued)

FOREIGN PATENT DOCUMENTS

DE 19507044 9/1996

(Continued)

OTHER PUBLICATIONS

Radek Vingralek, "GnatDb: A small-Footprint, Secure Database System", Abstract, downloaded print-out, www.star-lab.com.

(Continued)

*Primary Examiner*—Gilberto Barrón, Jr.
*Assistant Examiner*—Thomas M. Szymanski
(74) *Attorney, Agent, or Firm*—Morgan & Finnegan, LLP (57) ABSTRACT

Method, system and computer program product for implementing a trusted counter in a personal communication device. In particular, the method, system and computer program product utilizes cryptography and an external, read-write storage device that stores important state information that cannot be modified without detection. Using the present invention, the counter can be implemented in a personal even if state information is stored in an insecure storage device.

13 Claims, 6 Drawing Sheets

U.S. PATENT DOCUMENTS

| | | | |
|---|---|---|---|
| 5,841,865 A | 11/1998 | Sudia | 380/21 |
| 5,857,022 A | 1/1999 | Sudia | 380/30 |
| 6,009,150 A * | 12/1999 | Kamel | 379/88.22 |
| 6,009,177 A | 12/1999 | Sudia | 380/30 |
| 6,018,717 A | 1/2000 | Lee et al. | |
| 6,032,260 A * | 2/2000 | Sasmazel et al. | 726/10 |
| 6,038,551 A | 3/2000 | Barlow et al. | |
| 6,041,412 A | 3/2000 | Timson et al. | |
| 6,075,861 A * | 6/2000 | Miller, II | 380/28 |
| 6,085,976 A | 7/2000 | Sehr | |
| 6,148,404 A | 11/2000 | Yatsukawa | |
| 6,209,092 B1 | 3/2001 | Linnartz | |
| 6,311,171 B1 | 10/2001 | Dent | |
| 6,331,972 B1 | 12/2001 | Harris et al. | |
| 6,351,813 B1 | 2/2002 | Mooney et al. | |
| 6,358,151 B1 | 3/2002 | Enzminger et al. | |
| 6,367,011 B1 | 4/2002 | Lee et al. | |
| 6,609,114 B1 | 8/2003 | Gressel et al. | |
| 6,690,794 B1 | 2/2004 | Terao et al. | |
| 6,704,872 B1 | 3/2004 | Okada | |
| 6,779,112 B1 | 8/2004 | Guthery | |
| 6,816,707 B1 | 11/2004 | Barker et al. | |
| 6,842,741 B1 | 1/2005 | Fujimura | |
| 2001/0049667 A1 | 12/2001 | Moribatake et al. | |
| 2002/0023208 A1 | 2/2002 | Jancula | |
| 2002/0034302 A1 * | 3/2002 | Moriai et al. | 380/270 |
| 2002/0094090 A1 | 7/2002 | Iino | |

FOREIGN PATENT DOCUMENTS

| | | |
|---|---|---|
| EP | 0730253 | 9/1996 |
| EP | 1 081 891 | 3/2001 |
| WO | WO 95/19672 | 7/1995 |

OTHER PUBLICATIONS

William Shapiro et al., "How to Manager Persistent State in DRM System," Abstract, downloaded print-out, www.star-lab.com.

Diffie et al., "New Directions in Cryptography," IEEE Transactions on Information theory, Nov. 1976.

Antonio Maña et al., "GSM-Ticket: Generic Secure Mobile Ticketing Service", Gemplus Developer Conference, 'Online!, Jun. 21, 2001, pp. 1-7, XP002322564, Paris, France.

Masayuki Terada et al., "Copy Prevention Scheme For Rights Trading Infrastructure", Smart Card Research and Advanced Applications. IFIP TC8/WG8. 8 Fourth Working Conference on Smart Card Research and Advanced Applications, Kluwer Academic Publishers, Sep. 22, 2000, pp. 1-20, XP002952420, Bristol, UK.

Oorschot Menezes et al., "Handbook of Applied Cryptography", CRC Press Series on Discrete Mathematics and Its Applications, 1997, pp. 354-355 and 397-405, XP002322565, Boca Raton, FL, US.

Supplementary European Search Report, dated Apr. 11, 2005.

International Search Report mailed on Feb. 13, 2003, for International Application No. PCT/IB02/04294.

International Search Report mailed on Feb. 14, 2003 in International application No. PCT/IB02/04288.

Menezes et al. "Handbook of Applied Crytography", CRC Press LLC, 1997, 4 pp.

"Cryptography Terminology", Electronic Frontiers Australia Inc., http://web.archive.org/web/19970712154033/http://www.efa.org.au/Issues/Crypto/crypto5.ht...6/25/04, 2 pp.

* cited by examiner

METHOD, SYSTEM AND COMPUTER PROGRAM PRODUCT FOR A TRUSTED COUNTER IN AN EXTERNAL SECURITY ELEMENT FOR SECURING A PERSONAL COMMUNICATION DEVICE

CROSS-REFERENCE TO RELATED PATENT APPLICATION

This application is a continuation-in-part of application Ser. No. 09/978,701 titled, "A METHOD, SYSTEM AND COMPUTER PROGRAM PRODUCT FOR INTEGRITY-PROTECTED STORAGE IN A PERSONAL COMMUNICATION DEVICE" filed on Oct. 18, 2001, which is incorporated herein by reference.

FIELD OF THE INVENTION

A method, system and computer program product for implementing a trusted counter in a personal communication device. In particular, the method, system and computer program product combines cryptography and with an external tamper-resistant storage device to implement the trusted counter.

BACKGROUND OF THE INVENTION

The use of personal communication devices in every aspect of our daily lives has increase dramatically over recent years. With the proliferation of personal communication devices, it has become more and more important to protect the critical data stored within the device. For example, the use of a PIN has been implemented with personal communication devices to control access to the device. However, it is possible that one may guess the PIN if given an unlimited number of time and attempts to enter a PIN. Thus, in addition to the use of a PIN, it is useful to limit the number of attempts to enter a PIN.

In order to limit the number of attempts to access the device, it is necessary to use some type of counter in the personal communication device itself. The counter utilizes "state" information related to the critical data used by the device. Similar counters have been used in the area of digital rights management (DRM) for controlling the consumption of data content. For example, a third party might want to prevent a user of a personal communication device from playing a song more than 10 times. The right to play the song 10 times is delivered as an electronic voucher that specifies a 10-use restriction by implementing a counter. However, if a user can reset the counter after each use, the song can be played indefinitely without having to pay the owner of the data for each use. Thus, in the area of DRM various methods of cryptography have been used to protect the critical state information.

Cryptography involves the encoding or encrypting of digital data to render them incomprehensible by all but the intended recipients. In other words, the data is encrypted and the decryption key is delivered to those terminals or users that have paid to consume the data content. To this end, cryptographic systems can be used to preserve the privacy and integrity of the data by preventing the use and alteration of data by unauthorized parties. In addition to encryption, also authentication of the origin of the data is used in order to make sure that e.g., that only a party who has the right key can generate the right signature or message authentication code (MAC).

For example, a plaintext message consisting of digitized sounds, letters and/or numbers can be encoded numerically and then encrypted using a complex mathematical algorithm that transforms the encoded message based on a given set of numbers or digits, also known as a cipher key. The cipher key is a sequence of data bits that may either be randomly chosen or have special mathematical properties, depending on the algorithm or cryptosystem used. Sophisticated cryptographic algorithms implemented on computers can transform and manipulate numbers that are hundreds or thousands of bits in length and can resist any known method of unauthorized decryption. There are two basic classes of cryptographic algorithms: symmetric key algorithms and asymmetric key algorithms.

Symmetric key algorithms use an identical cipher key for both encrypting by the sender of the communication and decrypting by the receiver of the communication. Symmetric key cryptosystems are built on the mutual trust of the two parties sharing the cipher key to use the cryptosystem to protect against distrusted third parties. A well-known symmetric key algorithm is the National Data Encryption Standard (DES) algorithm first published by the National Institute of Standards and Technology. See Federal Register, Mar. 17, 1975, Vol. 40, No. 52 and Aug. 1, 1975, Vol. 40, No. 149. The sending cryptographic device uses the DES algorithm to encrypt the message when loaded with the cipher key (a DES cipher key is 56 bits long) for that session of communication (the session key). The recipient cryptographic device uses an inverse of the DES algorithm to decrypt the encrypted message when loaded with the same cipher key as was used for encryption.

Asymmetric key algorithms use different cipher keys for encrypting and decrypting. In a cryptosystem using an asymmetric key algorithm, the user makes the encryption key public and keeps the decryption key private, and it is not feasible to derive the private decryption key from the public encryption key. Thus, anyone who knows the public key of a particular user could encrypt a message to that user, whereas only the user who is the owner of the private key corresponding to that public key could decrypt the message. This public/private key system was first proposed in Diffie and Hellman, "New Directions in Cryptography," IEEE Transactions on Information Theory, November 1976, and in U.S. Pat. No. 4,200,770 (Hellman et al.), both of which are hereby incorporated by reference.

The Cryptographic systems noted above have been used to protect state information in a personal communication device by securely storing the state information in a couple of ways. First, by writing a snapshot to the state information and computing its "checksum," e.g., by using a one-way hash function. The result is stored within a tamper-resistant memory location of the device. Therefore, if someone tries to change the state information, the checksum of the result will not match the checksum value stored within the personal device. Second, by using a monotonic, persistent counter within the device. Every time there is a state change, the state information is stored along with the current counter value encrypted using a device key. Thus, no one can change the encrypted state information without the key.

However, both of these prior art methods require a small amount of read-write, tamper-resistant storage within the device itself. This might not always be feasible because of the expense of read-write storage.

Therefore, it is desirable to provide a system, method and computer program product that provides a trusted counter for protecting access to a personal communication device using a read-write, external tamper-resistant storage device.

The system, method and computer program product of the present invention disclosed herein address this need.

SUMMARY OF THE INVENTION

A method, system and computer program product for implementing a trusted counter for protecting access to a personal communication device or protecting integrity and/or confidentiality of critical data using cryptography.

The method, system and computer program product of the present invention uses an external, tamper-resistant storage device to store important state information that cannot be modified without detection.

It is contemplated by the invention that an external, tamper-resistant storage device provides a monotonically increasing, authenticated counter value to another storage device within the personal communication device.

It is contemplated by the invention that communication between storage devices for implementing a trusted counter is achieved using at least three basic communication protocols: 1) create, 2) read and 3) update.

BRIEF DESCRIPTION OF THE DRAWINGS

The accompanying figures best illustrate the details of the method, system and computer program product of the present invention for implementing a trusted counter in a personal communication device. Like reference numbers and designations in these figures refer to like elements.

DETAILED DESCRIPTION OF THE INVENTION

Figure 1:
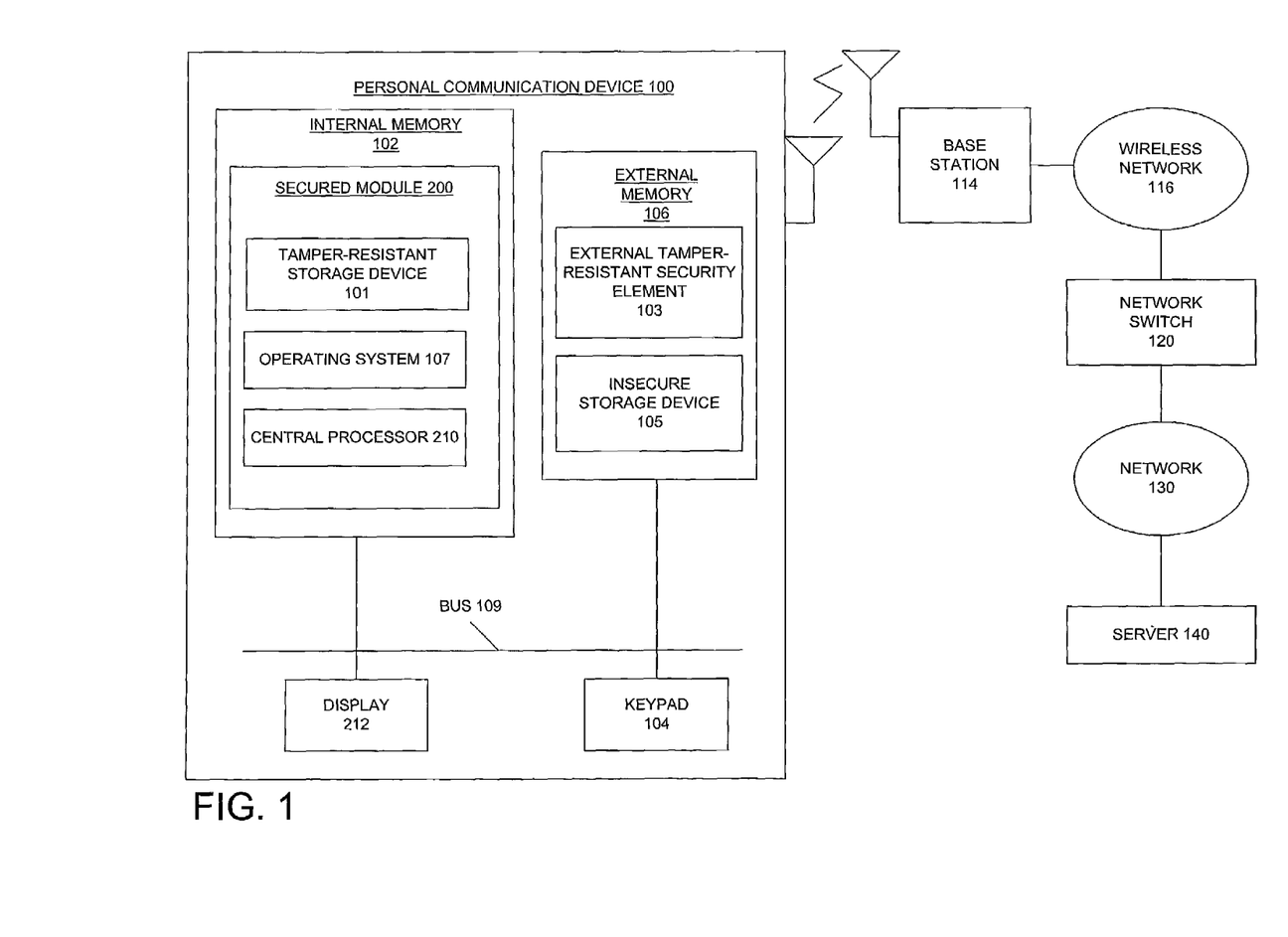
FIG. 1 is a network diagram depicting a personal communication device in accordance with an embodiment of the invention.

FIG. 1 illustrates an embodiment for implementing a trusted counter in a personal communication device that is incorporated into a wireless communication network. The personal communication device 100 is a wireless telephone, a satellite telephone, a personal digital assistant, or a bluetooth device. The personal communication device 100 includes an internal memory 102 and an external memory 106. Within the internal memory there is a secured module 200 that provides tamper-resistant storage for several elements and systems of the personal communication device 100. For example, the secured module 200 provides secured storage for a tamper-resistant storage device 101, central processor 210, and operating system 107. It is assumed in this embodiment of the invention that the personal communication device 100 does not have any read-write storage internal to the device that is tamper-resistant or otherwise. Tamper-resistant is a term known in the art that defines a secure section or memory or storage. A tamper-resistant boundary makes it difficult for an attacker to get at an internal element or data within a secure section. The tamper-resistant storage 101 is a read-only memory that is in communication with the external, tamper-resistant security element 103 and insecure storage device 105 of the external memory 106 via the bus 109. The external, tamper-resistant security element 103 and external, insecure memory 105 are read-write memory devices. The external security element 103 and storage device 105 are electronic cards such as smartcard, flashcard or WIM card that is received by the personal communication device 100.

Communication between the internal memory 102 and the external memory 106 is achieved using various protocol executed by the operating system 107 and the central processor 210. The protocol used for communication between the secured module 200 and the external, tamper-resistant security element 103 include a create protocol, a read protocol and an update protocol. A user (not shown) can communicate with the personal communication device 100 via the keypad 104 and the display 212. The personal communication device 100 in FIG. 1 is a wireless communication device that is connectable to a wireless network to receive and transmit data. The personal communication device in FIG. 1 is connectable to a wireless network 116 via a transmitted signal such as a frequency-modulated signal from the device 100 and received by a base station antenna 114. From the wireless network, the personal communication device can be connected to a computer server 140 via a network 130 and a wireless network switch 120. The network 130 can be a server, Intranet, Internet, public switching network (PSTN), public exchange (PBX) or the like.

The typical size requirements for the tamper-resistant storage device 101 is 128–256 bits of read-only memory. The typical size requirement of the security element 103 and storage device 105 is 1024–2048 bits of read-write memory for a typical asymmetric key. In addition to that, for each counter is needed typically about up to 128–256 bits. The external, tamper-resistant security element 103 can be used to store a monotonically increasing, authenticated counter value that can be used to secure "state" information such as the number of failed attempts to enter a PIN by a user. The external, insecure storage device 105 stores secured state information that is protected using a suitable cryptographic transform (encryption, authentication or a combination).

The use of a PIN to access the device 100 is implemented in a number of ways that are well known in the art. For example, the PIN is initially set to a default PIN by the manufacturer and later must be changed by the owner of the personal communication device 100 before use. In the alternative, there is no PIN initially and the owner of the device creates a PIN. It is contemplated by the invention that the device 100 also includes a PIN Unblock Code (PUK) that allows the recovery of a PIN if it is lost or forgotten by the rightful owner of the device 100.

Figure 2:
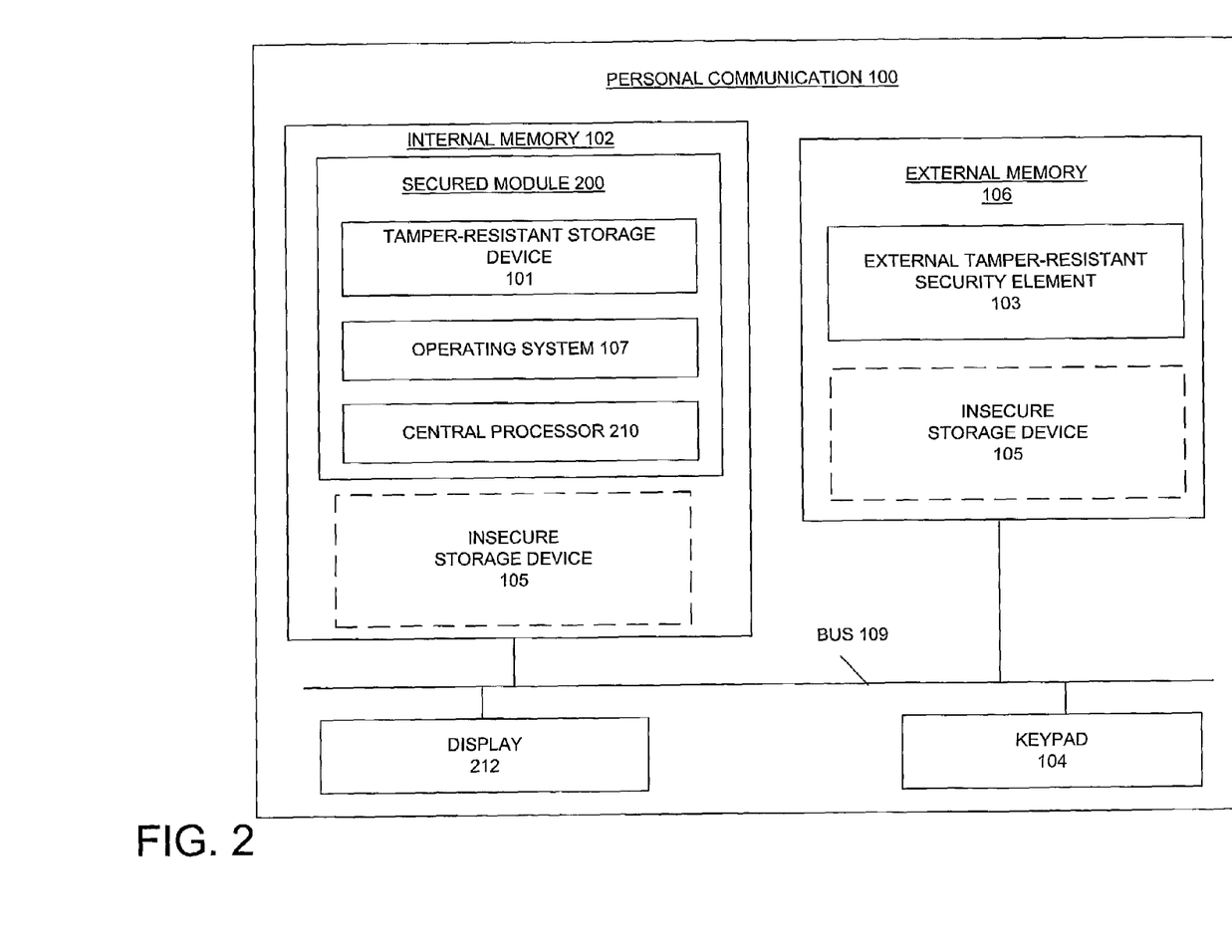
FIG. 2 is a network diagram depicting a personal communication device that includes an external insecure storage device.

FIG. 2 is directed to another embodiment of the invention that illustrates a personal communication device 100 that differs from FIG. 1 in that the insecure storage device 105 can be used as an internal or external storage device. Insecure as described herein means that the storage device is not tamper-resistant, as previously described in the description of FIG. 1. If the insecure storage device 105 is used as an internal storage device, it will be hardwired within the internal memory 102 of the personal communication device. Alternatively, the insecure storage device 105 is used as an external storage device that is part of the external memory

106. As part of the external memory, the insecure storage device 105 will be a removable electronic card such as a smartcard, flashcard, or WIM card.

The insecure storage device 105 is used to store secure data (i.e., "state information") by encrypting the data with for example a secret key. The state information stored is a counter value that is, for example, related to the number of failed attempts to enter a PIN number. Communication between the secured module 200, the external, tamper-resistant security element 103 and the insecure storage device 105 is achieved using a protocol executed the operating system 107 and a central processor 210 of the device 100. The protocols comprise at a create, read and update protocol.

As mentioned previously, a user (not shown) can communicate with the personal communication device 100 using a keypad 104 and display 212. The personal communication device in FIG. 2 (as in FIG. 1) is connectable to a wireless network 116 via a transmitted signal such as a frequency-modulated signal received from a base station antenna 114. From the wireless network the personal communication device 100 can be connected to a computer server 140 from a network 130 and a wireless network switch 120. The network 130 can comprise a server, the Internet, an Intranet, a PSTN, a PBX, or the like.

Figure 3:
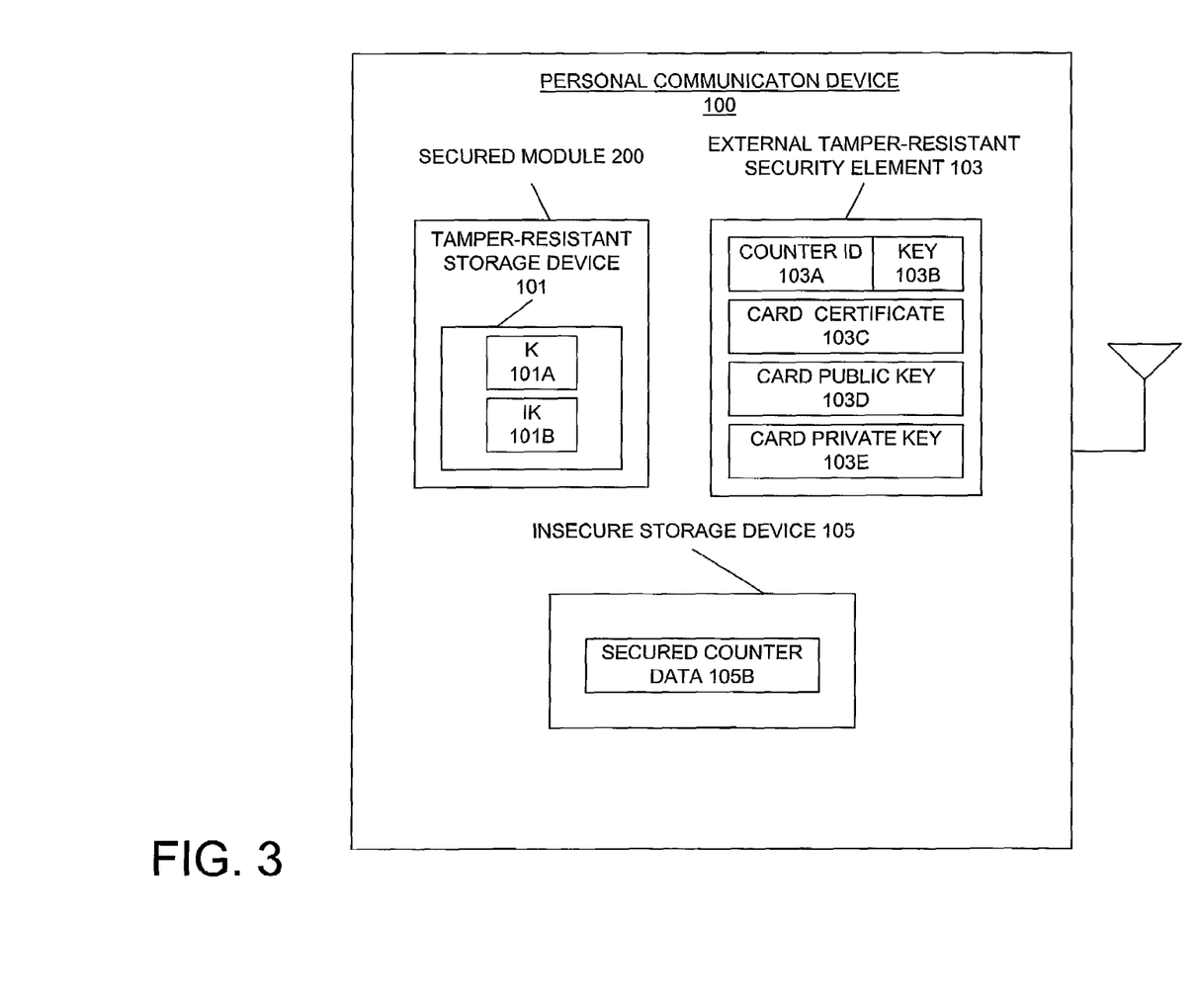
FIG. 3 is a detailed diagram of two storage devices in accordance with an embodiment of the present invention.

FIG. 3 illustrates in more detail a use of encryption by the secured module 200, and the external, tamper-resistant security element 103 in accordance with an embodiment of the invention. The tamper-resistant storage device 101 has a secret key 101*a* from which an integrity key 101*b* can be derived. However, the integrity key 101*b* can also be determined independently from the secret key 110*a* as well. The personal communication device does not have any read-write storage, tamper-resistant or otherwise. In other words, the personal communication device 100 does not have any hardwired read-write memory. Thus, the only read-write storage would be provided by the external, tamper-resistant security element 103 and insecure storage device 105.

The external, tamper-resistant security element 103 has an encryption key pair that consists of a card public key 103*d* and a card private key 103*e*. Additionally, the external tamper-resistant security element 103 includes a card certificate 103*c* or compliance certificate that is used to prove that the external, tamper-resistant security element 103 was manufactured by a trusted third party. The external, tamper-resistant security element 103 has a memory location for storing a counterID 103*a*, and a secret key 103*b*. In this embodiment, key 103*b* is derived from the integrity key 101*b* and is supplied by the tamper-resistant device 101. The key 103*b* is used to authenticate the response to read counter and update counter requests. It may also be used to authenticate the requests themselves. Additionally, the card public key 103*d* stored in the external, tamper-resistant security element 103 is used by the secured module 200 to assure that the external, tamper-resistant security element 103 is manufactured by a trusted third party. The counter value and "state" information stored in the insecure storage device 105 are encrypted with a secret key 101*a* from the tamper-resistant storage device 101.

Figure 4:
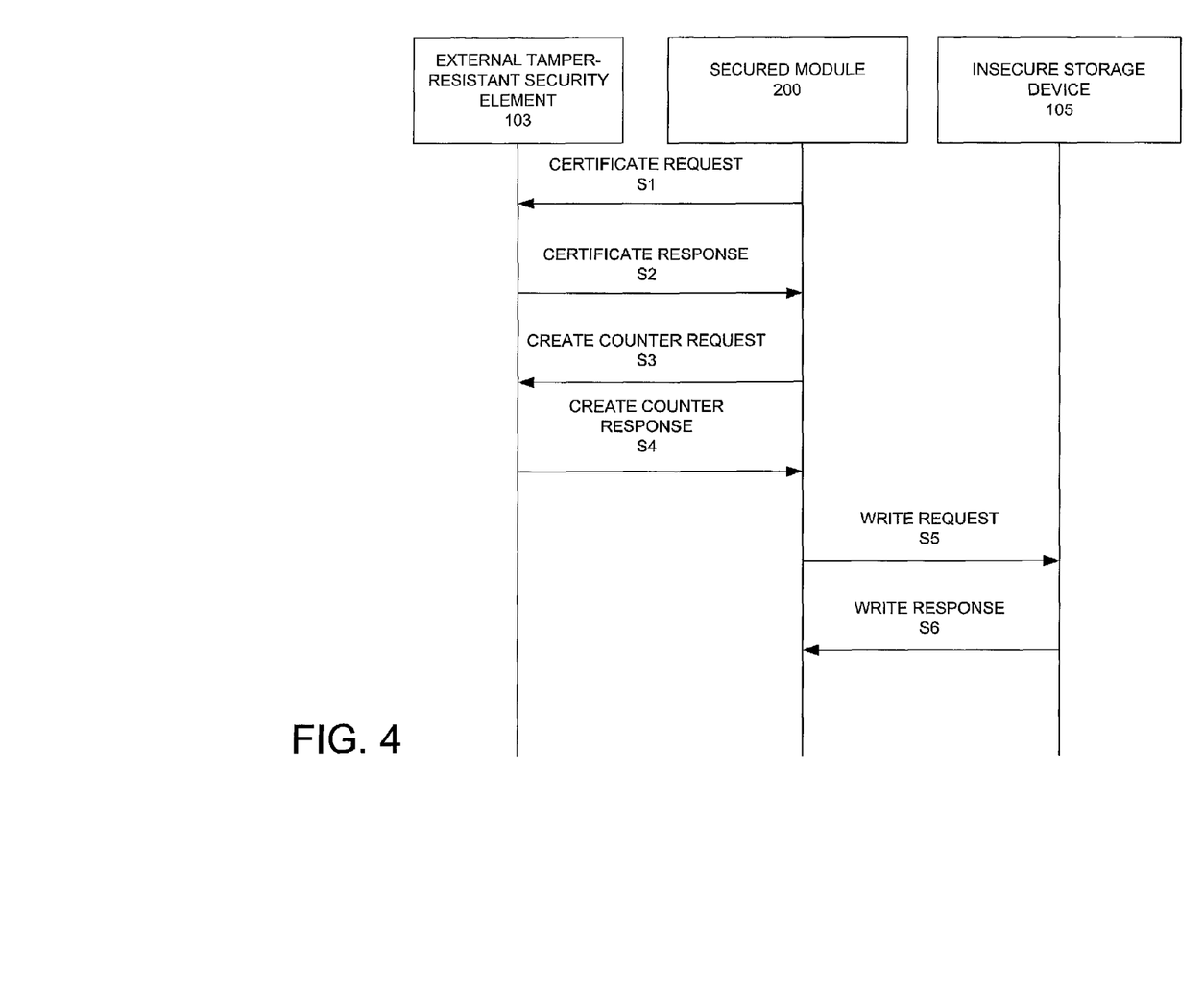
FIG. 4 is a flow diagram depicting the execution of the create counter protocol in accordance with an embodiment of the invention.
Figure 5:
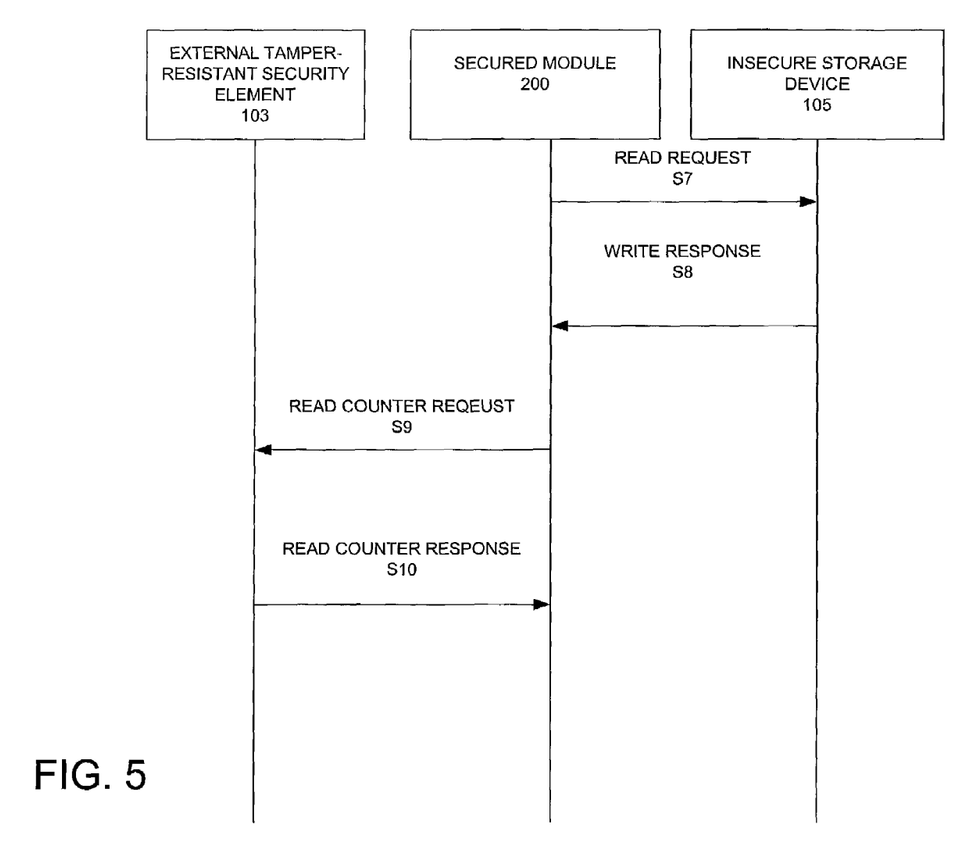
FIG. 5 is a flow diagram depicting the execution of the read counter protocol in accordance with an embodiment of the invention.
Figure 6:
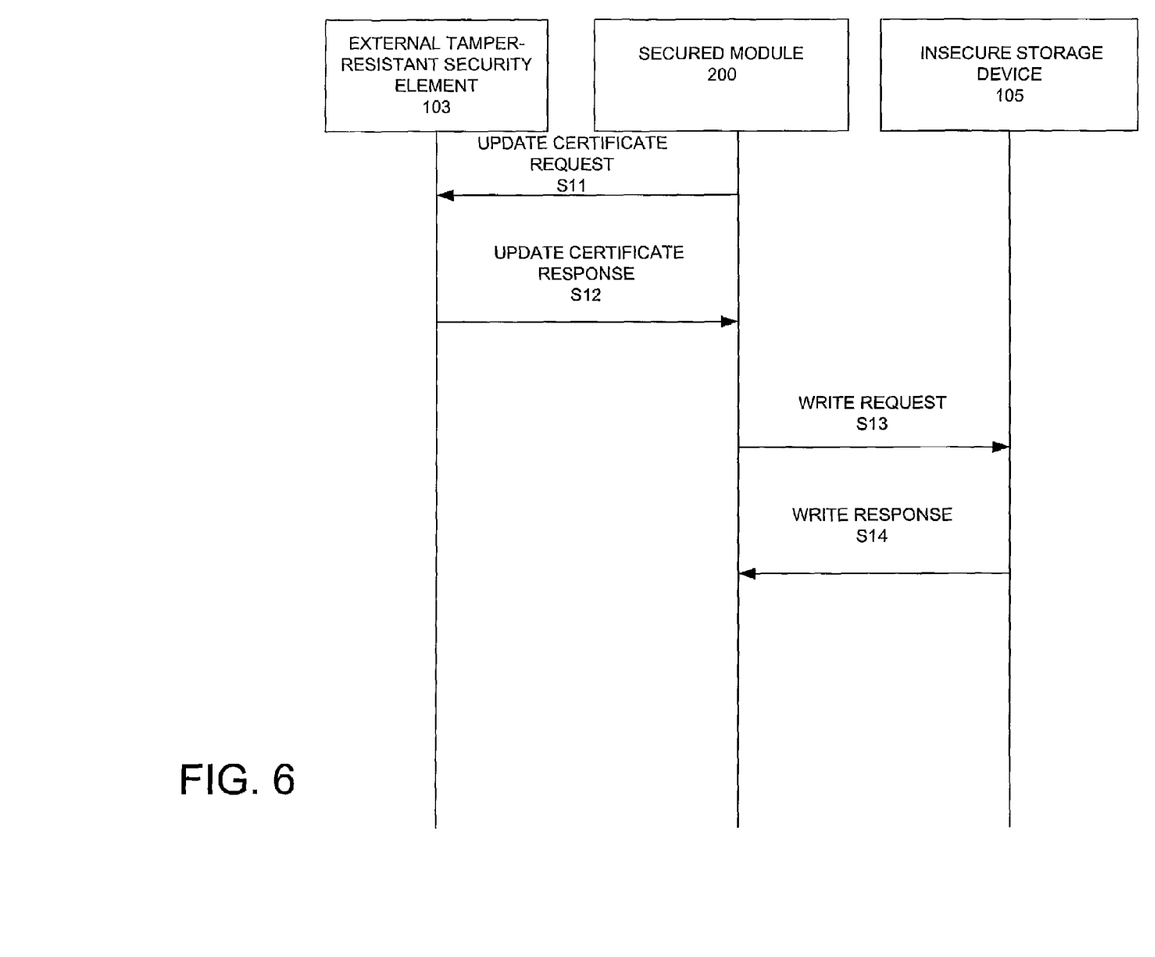
FIG. 6 is a flow diagram depicting the execution of the update counter protocol in accordance with an embodiment of the invention.

FIGS. 4–6 illustrates the steps for implementing at trusted counter in the personal communication device 100 through communication between the external, tamper-resistant security element 103 and insecure storage device 105.

FIG. 4 illustrates the steps involved for executing the create protocol that is used for creating a counter value to be used by the personal communication device. Initially, in step S1 secured module 200 requests the card certificate 103*c* stored in the external, tamper-resistant security element 103. In another embodiment of the invention, the card certificate 103*c* itself is not stored in the device 103, but a pointer such as an URL of the certificate is stored in the device. In step S2 the external, tamper-resistant security element 103 sends a card certificate 103*c*, which is verified by the secured module 200 as a compliant card using a certificate chain. In an embodiment where the pointer to the card certificate is stored in the device, the pointer to the card certificate is returned and the device 101 fetches the certificate 103*c* from the location implied by the pointer. Two certificates can be used in order for the secured module 200 to verify that the external, tamper-resistant security element 103 possesses a compliant card certificate 103*c*. For example, a certificate issued by the manufacturer of the tamper-resistant storage device 101 to the manufacturer of the external tamper-resistant security element 103, and a compliant card certificate issued by the manufacturer of the external, tamper-resistant security element 103 to the external, tamper-resistant security element 103 itself. In step S3, the secured module 200 issues a create counter request to the external, tamper-resistant security element 103 and in S4 the external, tamper-resistant security element 103 sends an counterID that uniquely identifies the current counter value. In step S3, module 200 also sends an integrity key encrypted with the public key 103*d* to element 103. Element 103 will store this integrity key as 103*b*. In step S5, the secured module 200 receives the counter and computes and envelope by applying a suitable cryptographic transform (encryption, authentication or a combination), and writes the state value along with the counter value to the insecure storage device 105. In step S6, the insecure storage device returns an acknowledgement of proper receipt of the state value or sends a message indicating that an error has occurred.

FIG. 5 illustrate the read protocol in accordance with an embodiment of the invention. In step S7, the tamper-resistant storage device issues a read request to the insecure storage device 105 for reading the state value. In step S8, the insecure storage device responds to the request by the returning raw data that is the envelope for the current state value. Before the secured module 200 can accept the data, the secured module 200 verifies that the envelope was formed correctly, and then extracts its contents. In order to accept the data as the current state value, the secured module 200 must check to see if the alleged counter value stored with this date is the same as the current counter value of the counterID stored in the external, tamper-resistant security element 103. Specifically, in step S9, secured module 200 sends a read counter request along with a random challenge to the external, tamper-resistant security element 103 to read the counterID stored in the element 103. The read request from the secured module 200 can be authenticated using an authorization token computed using the integrity key 101*b*, if necessary. In step S10, the external, tamper-resistant security element 103 returns a token in response to the read request. The authorization token is completed using a message authentication code function such as HMAC-MD5 with the integrity key 103*b* as the key of the MAC function, and the value of the counter, with the specified unique identifier countered, created in FIG. 4 as the input of the MAC function. Alternatively, the external, tamper-resistant security element 103 can use a digital signature to authenticate the response to the read request by the secured module 200. The secured module 200 then checks to see if the stored counter values are equal. If so, the data is accepted as the current state information for the counter. In an embodiment where the digital signatures are used there is no need to exchange or store key 103b, but read and update responses are authenticated by signing with key 103e. Further in such an embodiment, in steps S5 and S14, the created envelope also includes the public key 103d, which will be used by the device 100 to verify read and update responses.

FIG. 6 illustrates an update request protocol between the secured module 200, the external, tamper-resistant security element 103 and the insecure storage device 105 in accordance with an embodiment of the invention. In step S11, the secured module 200 has computed new or a change in state information of the counter and requests that the external, tamper-resistant security element 103 update the counter value using the counterID. The request is also sent along with a challenge. In step S12, the external, tamper-resistant security element 103 responds by updating the counter and returns the updated state information for the counter along with an authorization token. The authentication token is constructed using the integrity key 103b and counterID specific to the new counter value to be created.

In step S13, the secured module 200 verifies the authorization token, forms a new envelope for the new state value along with the new counter value and then writes the envelope to the insecure storage device 105. In step S14, the insecure storage device responds to the write request by the tamper-resistant storage device by indicating that the write request is successful or not successful.

Although illustrative embodiments have been described herein in detail, its should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A system for implementing a trusted counter in a personal communication device, comprising:
   a secure module in a personal communication device comprising a first read-only, tamper resistant storage device, said personal communication device containing no writable storage;
   a second read-write, tamper resistant storage device in an electronic card removable from the personal communication device;
   a third read-write, insecure storage device in the removable electronic card; and
   a processor in communication with the secure module, the second and the third storage devices configured to:
   execute authentication of the second storage device by the secure module;
   issue a create counter request by the secure module to the second storage device;
   send a unique ID identifying a current counter value from the second storage device to the secure module;
   compute an encrypted envelope of the unique ID with the secured module by applying a cryptographic transform to the unique ID; and
   write a state value and the encrypted envelope of the unique ID to the third storage device.

2. The system of claim 1, wherein said state information and counter value includes a number of failed attempts to correctly enter a PIN to gain access to said personal communication device.

3. The system of claim 1, wherein said second storage device and said third storage device are external, read-write memory devices.

4. The system of claim 1, wherein said second storage device and said third storage devices are on a removable electronic card that is received by said personal communication device.

5. The system of claim 1, wherein the communication between said processor and said secure module, second storage device and third storage device comprises the execution of a plurality of protocols using an operating system of the personal communication device.

6. The system of claim 5, wherein said plurality of protocols are comprised of a create protocol, a read protocol, an update protocol.

7. The system of claim 1, wherein said personal communication device comprises a cellular telephone, a satellite telephone, a personal digital assistant or a bluetooth device.

8. The method for implementing a trusted counter in a personal communication device, comprising a first, internal read-only, tamper resistant storage device within a secure module, said personal communication device containing no writable storage, a second, external read-write, tamper resistant storage device, and a third, external read-write, insecure storage device, the method comprising:
   authenticating the second storage device;
   issuing a create counter request by the secure module to the second storage device;
   sending a unique ID identifying a current counter value from the second storage device to the secure module;
   computing an encrypted envelope of the unique ID with the secured module by applying a cryptographic transform to the unique ID; and
   writing a state value and the encrypted envelope of the unique ID to the third storage device.

9. The system of claim 8, wherein said state information and counter value includes a number of failed attempts to correctly enter a PIN to access said personal communication device.

10. The method of claim 8, wherein the personal communication device is a cellular telephone, a satellite telephone, a personal digital assistant or a bluetooth device.

11. A computer program product for implementing a trusted counter in a personal communication device comprising a first, internal read-only, tamper resistant storage device within a secure module, said personal communication device containing no writable storage, a second, external read-write, tamper resistant storage device, and a third, external read-write, insecure storage device, the method comprising:
   a computer readable medium;
   program code in said computer readable medium for authenticating second storage device;
   program code in said computer readable medium for issuing a create counter request by the secure module to the second storage device;
   program code in said computer readable medium for sending a unique ID identifying a current counter value from the second storage device to the secure module;
   program code in said computer readable medium for computing an encrypted envelope of the unique ID with the secured module by applying a cryptographic transform to the unique ID; and
   program code in said computer readable medium for writing a state value and the encrypted envelope of the unique ID to the third storage device.

12. The computer program product of claim 11, wherein the program code for authenticating of said second storage device further comprises:
  program code for receiving a compliance certificate and a public key from the second storage device; and
  program code for verifying the authenticity of the compliance certificate.

13. The computer program product of claim 11, wherein the program code further comprises program code for receiving a success or failure indication from said third storage device.

* * * * *